(No Model.)
J. C. McCANDLESS.
COTTON SCRAPER, CHOPPER, AND CULTIVATOR.
No. 388,985. Patented Sept. 4, 1888.
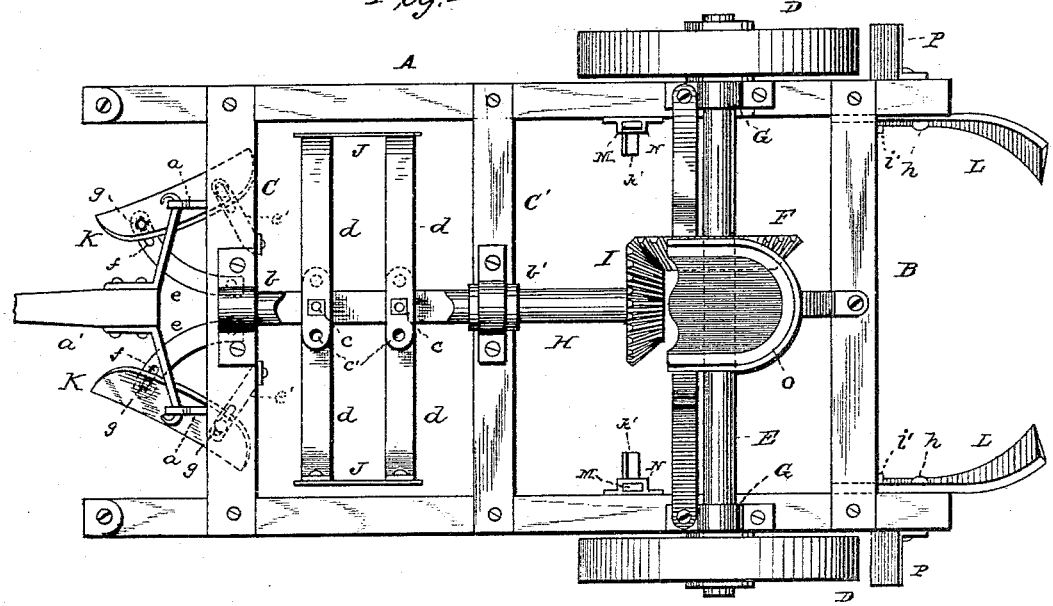
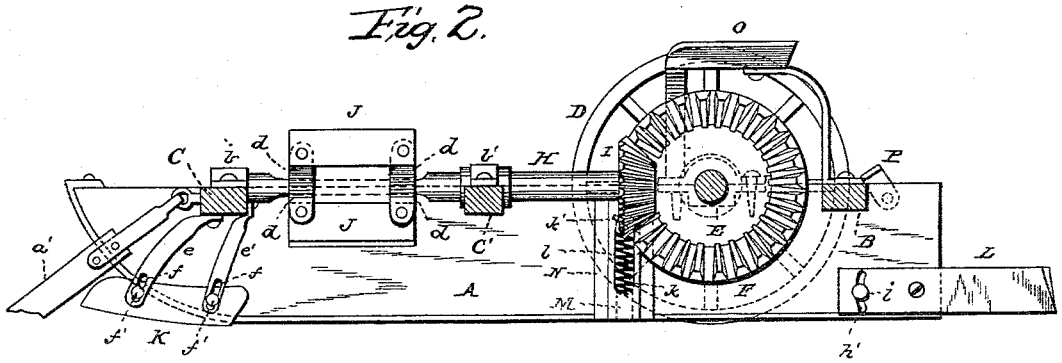
WITNESSES.
K. B. Harris.
C. R. Ferguson.
INVENTOR.
J. C. McCandless.
by E. W. Anderson,
his Attorney.

UNITED STATES PATENT OFFICE.

JOHN C. McCANDLESS, OF RANDOLPH, KANSAS.

COTTON SCRAPER, CHOPPER, AND CULTIVATOR.

SPECIFICATION forming part of Letters Patent No. 388,985, dated September 4, 1888.

Application filed May 26, 1888. Serial No. 275,187. (No model.)

*To all whom it may concern:*

Be it known that I, JOHN C. McCANDLESS, a citizen of the United States, and a resident of Randolph, in the county of Riley and State of Kansas, have invented certain new and useful Improvements in Cotton Choppers and Cultivators; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a plan view of my improved cultivator. Fig. 2 is a side elevation, partly broken away.

The invention relates to improvements in cotton and sorghum scrapers and cultivators; and it consists in the construction and novel combination of parts, as hereinafter set forth, the object of the invention being to provide a machine so constructed as to scrape both sides of the row, and at the same time to chop out any desired width and to cultivate the young plant by drawing back all the necessary loose soil.

Referring to the drawings, A designates two runners secured together by the rear transverse bar, B, and the two forward transverse bars, C C', the bar C being provided with eyes $a$, to which the tongue $a'$ is attached.

D D represent the drive-wheels secured to the outer ends of the axle-shaft E, having the bevel gear-wheel F thereon between the runners. The axle E is journaled in bearing-boxes G, secured to the upper edges of the runners A, and said runners hang beneath the axle, with their lower edges slightly above the lower plane of the drive-wheels. The drive-wheels are designed to impart motion to the choppers, and the runners are provided to retain the front portion of the machine at a proper and uniform distance from the ground by bearing thereon.

H is a longitudinal shaft having bearings $b$ $b'$ on the transverse bars C C', as shown, and provided at its inner end with the bevel-gear I, meshing with the gear F on the axle-shaft. Two or more chopping-hoes, J, rotate with the shaft H, and are secured thereto by bolts $c$, passing through said shaft and through openings $c'$ in the arms $d$ of the hoes. The arms $d$ are provided with a series of the openings $c'$, so that the hoes may be regulated or adjusted to any required depth of cut.

K K designate two curved scrapers, rearwardly diverging, and secured by bolts or otherwise to the lower ends of the hangers $e$ $e'$, the lower ends of said hangers being provided with slot-openings $f$, through which the threaded bolts $f'$ pass, and upon which the scrapers are outwardly and inwardly adjustable, the nuts $g$ being tightened on the bolts to secure the scrapers as adjusted.

It will be observed that the scraper-hangers are secured to the transverse bar C and that the scrapers break the earth on opposite sides of the plants, turning the soil outwardly.

L L represent two inwardly-curved scrapers pivotally connected to the runners, as at $h$, and having the transverse slot $h'$ moving on the bolt $i$, so that the runners are vertically adjustable. The scrapers L are designed to turn the soil inwardly against the plants.

Rudder-pins M are secured within suitable casings, N, to the inner sides of the runners, and are held free from the ground by the springs $k$, coiled around the rounded portion of the bolt. Arms $k$ extend inwardly from the bolts through slot-openings $l$ in the casing N. The rudder-pins are operated by the driver from the seat O by placing his foot on the arm and forcing the pin downward on the side in the direction which it is desired to turn the forward end of the runners. The outwardly-turned plates P on the runners are designed to scrape the wet earth from the rim of the drive-wheels, and they may be thrown in or out of engagement with the wheels by turning them on the pivot-pins $m$.

Having described my invention, what I claim is—

1. The combination, with the drive-wheels, the axle, and the runners having the transverse bars, of the hangers having the slot-openings, the bolts $f'$, the inwardly-curved scrapers L, pivotally connected to the runners and having the adjusting-slot, the bolt $i$, the gear-wheels, and the choppers, substantially as specified.

2. In a cotton chopper and cultivator, the combination, with the runners, of the rudder-pins secured within the casing N, and having the arm K extending through the casing, and the coiled spring, substantially as specified.

3. In a cotton chopper and cultivator, the combination, with the runners and the drive-wheels, of the outwardly-turned scraper-plates pivoted on said runners and adapted to be turned in and out of engagement with the drive-wheels, substantially as specified.

In testimony whereof I affix my signature in presence of two witnesses.

JOHN C. McCANDLESS.

Witnesses:
CHAS. S. LEWIS,
T. B. LEWIS.